(12) United States Patent
Mishra et al.

(10) Patent No.: US 12,487,913 B2
(45) Date of Patent: Dec. 2, 2025

(54) MACHINE-LEARNING BASED PREDICTION OF DEFECT-PRONE COMPONENTS OF INFORMATION TECHNOLOGY ASSETS

(71) Applicant: Dell Products L.P., Round Rock, TX (US)

(72) Inventors: Abhishek Mishra, Bangalore (IN); Vivek Bhargava, Bangalore (IN); Sharada Desai, Bangalore (IN); Kumar Saurav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 18/342,882

(22) Filed: Jun. 28, 2023

(65) Prior Publication Data

US 2025/0004936 A1  Jan. 2, 2025

(51) Int. Cl.
*G06F 11/3668* (2025.01)
*G06F 11/3604* (2025.01)
*G06F 11/362* (2025.01)

(52) U.S. Cl.
CPC ...... *G06F 11/3692* (2013.01); *G06F 11/3608* (2013.01); *G06F 11/3648* (2013.01)

(58) Field of Classification Search
None
See application file for complete search history.

(56) References Cited

U.S. PATENT DOCUMENTS

| 10,929,268 | B2* | 2/2021 | Bhat | G06N 20/00 |
| 2013/0311968 | A1* | 11/2013 | Sharma | G06F 11/3692 |
| | | | | 717/101 |
| 2021/0064361 | A1* | 3/2021 | Jayaraman | G06N 20/10 |

(Continued)

OTHER PUBLICATIONS

L. M. Gladence et al., "A Statistical Comparison of Logistic Regression and Different Bayes Classification Methods for Machine Learning," ARPN Journal of Engineering and Applied Sciences, vol. 10, No. 14, Aug. 2015, pp. 5947-5953.

(Continued)

*Primary Examiner* — Duy Khuong T Nguyen
*Assistant Examiner* — Mark A Gooray
(74) *Attorney, Agent, or Firm* — Ryan, Mason & Lewis, LLP

(57) ABSTRACT

An apparatus comprises a processing device configured to determine specifications for an information technology asset to be developed, and to identify, utilizing at least one machine learning model, whether at least one of the specifications for the information technology asset is defect-prone, wherein a given specification is identified as defect-prone responsive to at least one output of the at least one machine learning model indicating that the given specification has at least a threshold likelihood of resulting in one or more defects during development of the information technology asset. The processing device is also configured to establish a mapping between the one or more identified defect-prone specifications for the information technology asset and one or more components of the information technology asset, and to modify one or more development processes for the information technology asset based at least in part on the established mapping.

20 Claims, 14 Drawing Sheets

(56) References Cited

U.S. PATENT DOCUMENTS

2024/0330413 A1\* 10/2024 Hamzeh ............... G10L 15/197

OTHER PUBLICATIONS

A. Y. Ng et al., "On Discriminative vs. Generative Classifiers: A Comparison of Logistic Regression and Naive Bayes," Advances in Neural Information Processing Systems, Jan. 3, 2001, 8 pages.

V. T. Faniran et al., "Adopting Scrum as an Agile Approach in Distributed Software Development: A Review of Literature," 1st International Conference on Next Generation Computing Applications, Jul. 2017, 5 pages.

F. A. Batarsch et al., "Predicting Failures in Agile Software Development through Data Analytics," Software Quality Journal, Aug. 9, 2015, 18 pages.

\* cited by examiner 600-1

```
# Import historical defect dataset and historical requirements dataset
      Data_Defects = fetch_historical_defects();
      Data_Requirements = fetch_historical_requirements();

# Get the defect/requirement categories from the historical datasets
      Category_Defects = Data_Defects.Category;
      Category_Req = Data_Requirements.Category;

# Define training and test datasets for defects and requirements
      Defect_Train, Defect_Test, Defect_Category_Train, Defect_Category_Test =
      train_test_split(Data_Defects, Category_Defects);
      Req_Train, Req_Test, Req_Category_Train, Req_Category_Test =
      train_test_split(Data_Requirements, Category_Req);

# Build and fit the model
      cv = CountVectorizer();
      Defect_Train_CV = cv.transform(Defect_Train);
      Req_Train_CV = cv.transform(Req_Train);
      Defect_Test_CV = cv.transform(Defect_Test);
      Req_Test_CV = cv.transform(Req_Test);
      Naïve.bayes.fit(Defect_Train, Defect_Category_Train);
      Predictions.Defect_Cat = naive_bayes.predict(Defect_Test_CV);
      Naïve.bayes.fit(Req_Train_CV, Req_Category_Train);
      Predictions_Req_Cat = naive_bayes.predict(Req_Test_CV);

# Check accuracy of the model
      print('Accuracy score: ', accuracy_score(Defect_Test, predictions));
      print('Precision score: ', precision_score(Defect_Test, predictions));
      print('Recall score: ', recall_score(Defect_Test, predictions));
      print('Accuracy score: ', accuracy_score(Req_Test, predictions));
      print('Precision score: ', precision_score(Req_Test, predictions));
      print('Recall score: ', recall_score(Req_Test, predictions));

# Merge categorized defect dataset and requirement dataset
      Merged_DS_Defect_Req = merge(Data_Defects, Data_Requirements, on='Category');

# Add and assign value for "Is prone to defect" column
      Merged_DS_Defect_Req['Is prone to defect'] = Yes where
      (Merged_DS_Defect_Req['DefectID']='True');
```

FIG. 6A

```
# Build and fit model to predict "Is prone to defect" based on requirement description
# Divide data into training and test datasets
        Merged_DS_Defect_Req_ISD = Merged_DS_Defect_Req.(Is Prone to Defect);
        Merged_DS_Defect_Req_Train, Merged_DS_Defect_Req_Test,
        Merged_DS_Defect_Req_ISD_Train, Merged_DS_Defect_Req_ISD_Test =
        train_test_split(Merged_DS_Defect_Req);

# Model building
        cv = CountVectorizer()'
        Merged_DS_Defect_Req_Train_CV = cv.transform(Merged_DS_Defect_Req_Train);
        Merged_DS_Defect_Req_Test_CV = cv.transform(Merged_DS_Defect_Req_Test);
        Naïve_bayes = MultinomialNB();
        Naïve.bayes.fit(Merged_DS_Defect_Req_Train_CV, Merged_DS_Defect_Req_Test);
        Predictions_defect_Cat = naïve_bayes.predict(Merged_DS_Defect_Req_Test);

# Check accuracy
        print('Accuracy score: ', accuracy_score(Merged_DS_Defect_Req_Test, predictions));
        print('Precision score: ', precision_score(Merged_DS_Defect_Req_Test, predictions));
        print('Recall score: ', recall_score(Merged_DS_Defect_Req_Test, predictions));

# Model is ready to predict new datasets.
# Test dataset can be replaced with actual dataset in order to get predictions
```

| Requirement Identifier (ReqID) | Requirement Description | Predicted Category | Is Prone to defect | Associated Defect history |
|---|---|---|---|---|
| Req11 | Add captcha image for login action | Login | Yes | Defect#006: User is not receiving the one-time passcode (OTP) for resetting the password. |

| Historical Merged Defects and Requirements - Test Dataset ||||||| 
|---|---|---|---|---|---|---|
| Requirement Identifier (ReqID) | Requirement Description | Requirement Category | Associated Defect Identifier | Defect Description | Defect Associated (Actual) | Defect Associated (Predicted) |
| Req11 | On selecting designated option, user should be able to enter the support month | Software | N/A | N/A | No | Yes |
| Req12 | User should be able to configure hardware and add support to it | Services | Defect#009 | Adding an expansion kit in certain hardware does not work properly. | Yes | Yes |
| Req13 | A link should appear in four Fibre channel (FC) host bus adapters (HBA) in new path | Hardware | Defect#002 | Reported that configuration becomes incomplete when cloud tier solution bundle is selected as "Yes", without any error message. There is only a warning message saying "Order. | Yes | Yes |
| Req14 | While configuring a path, the relevant models should appear | Software | Defect#006 | User cannot add partner support to certain data domain quotes. | Yes | Yes |

FIG. 10

MACHINE-LEARNING BASED PREDICTION OF DEFECT-PRONE COMPONENTS OF INFORMATION TECHNOLOGY ASSETS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to management of information processing systems.

BACKGROUND

Product development processes, including software development processes, typically include multiple environments, such as one or more development environments, one or more integration testing environments, a staging environment, and a production environment. New software code may be created by individual developers or small teams of developers in respective ones of the development environments. The integration testing environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for machine-learning based prediction of defect-prone components of information technology assets.

In one embodiment, an apparatus comprises at least one processing device comprising a processor coupled to a memory. The at least one processing device is configured to determine one or more specifications for an information technology asset to be developed, and to identify, utilizing at least one machine learning model, whether at least one of the one or more specifications for the information technology asset is defect-prone, wherein a given one of the one or more specifications is identified as defect-prone responsive to at least one output of the at least one machine learning model indicating that the given specification has at least a threshold likelihood of resulting in one or more defects during development of the information technology asset. The at least one processing device is also configured to establish a mapping between the one or more identified defect-prone specifications for the information technology asset and one or more components of the information technology asset, and to modify one or more development processes for the information technology asset based at least in part on the established mapping.

These and other illustrative embodiments include, without limitation, methods, apparatus, networks, systems and processor-readable storage media.

BRIEF DESCRIPTION OF THE DRAWINGS

FIGS. 6A and 6B show pseudocode for defect prediction in an illustrative embodiment.

FIG. 7 shows a table of outputs from running a defect prediction tool in an illustrative embodiment.

FIG. 10 shows a table of a testing dataset with predictions of defect-prone information technology asset requirements in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
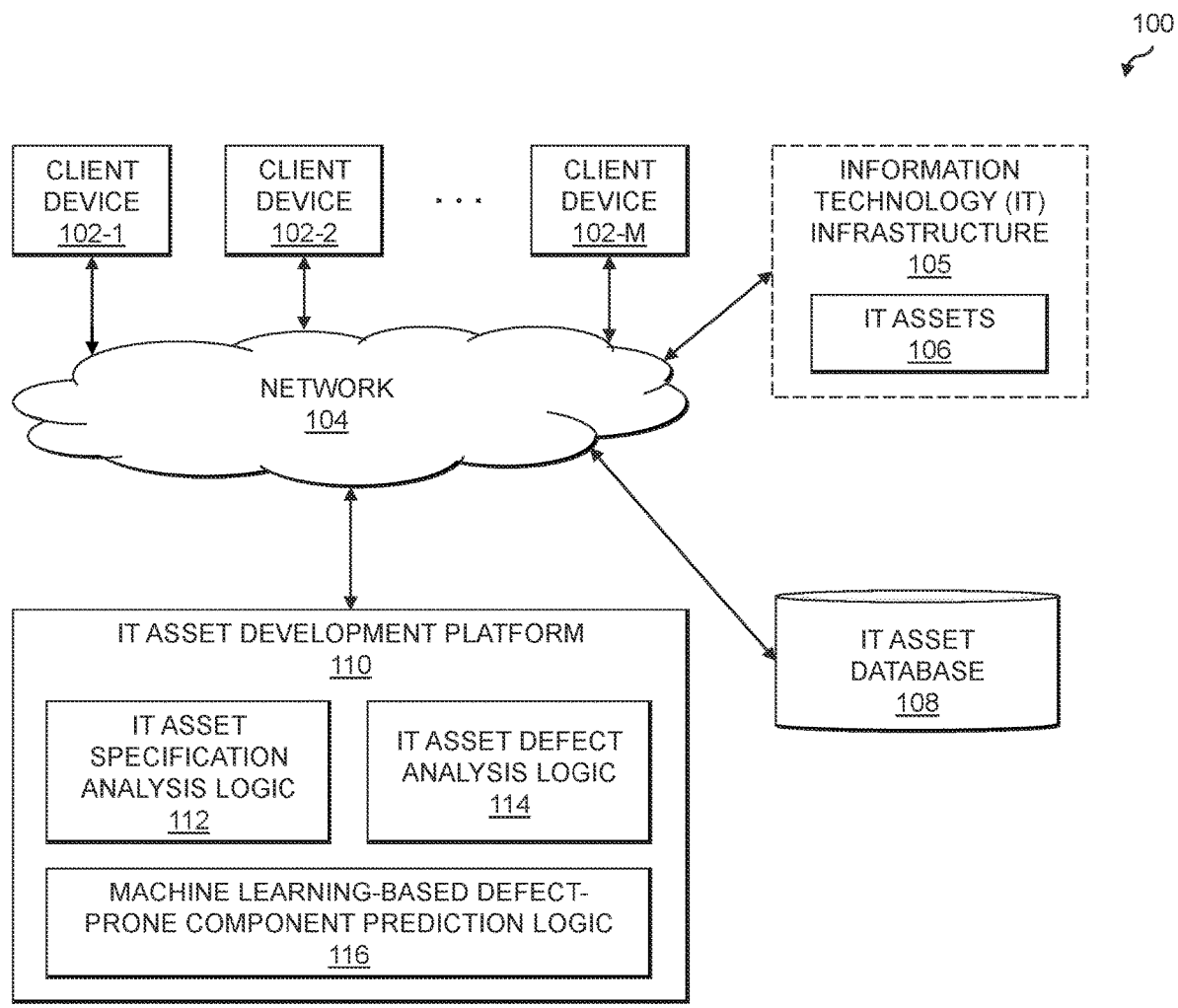
FIG. 1 is a block diagram of an information processing system configured for machine-learning based prediction of defect-prone components of information technology assets in an illustrative embodiment.

FIG. 1 shows an information processing system 100 configured in accordance with an illustrative embodiment. The information processing system 100 is assumed to be built on at least one processing platform and provides functionality for predicting defect-prone specifications for information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an IT asset database 108, and an IT asset development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the IT asset development platform 110 is used by or for an enterprise system. For example, an enterprise may subscribe to or otherwise utilize the IT asset development platform 110 for managing product development lifecycles for its assets (e.g., IT assets 106 in the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities). In other embodiments, the IT asset development platform 110 may be operated by an enterprise that is a hardware or software vendor of assets (e.g., IT assets 106 in the IT infrastructure 105, the client devices 102).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The IT asset database 108 is configured to store and record various information that is utilized by the IT asset development platform 110 in managing product development lifecycles for the IT assets 106 of the IT infrastructure 105. Such information may include, for example, sets of keywords used for identifying categories or topics associated with IT asset specifications (also referred to as requirements) and defects/incidents, descriptions associated with IT asset specifications and defects/incidents, historical IT asset specifications and defects/incidents, associations between IT asset specifications and defects/incidents, etc. In some embodiments, one or more storage systems utilized to implement the IT asset database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the IT asset development platform 110, as well as to support communication between the IT asset development platform 110 and other related systems and devices not explicitly shown.

In some embodiments, the client devices 102 are assumed to be associated with system administrators, IT managers or other authorized personnel responsible for managing product development lifecycles for the IT assets 106 of the IT infrastructure 105. For example, a given one of the client devices 102 may be operated by a user to access a graphical user interface (GUI) provided by the IT asset development platform 110 to manage one or more of the IT assets 106 of the IT infrastructure 105. The IT asset development platform 110 may be provided as a cloud service that is accessible by the given client device 102 to allow the user thereof to manage the product development lifecycle of one or more of the IT assets 106 of the IT infrastructure 105 (e.g., to identify defect-prone areas or components of the one or more of the IT assets 106, and to take precautionary measures during development of the one or more IT assets 106 to avoid defects in the identified defect-prone areas or components, to identify and fix defects in the identified defect-prone areas or components at earlier points in the product development lifecycle, etc.). In some embodiments, the IT assets 106 of the IT infrastructure 105 are owned or operated by the same enterprise that operates the IT asset development platform 110 (e.g., where an enterprise such as a business provides support for the assets it operates). In other embodiments, the IT assets 106 of the IT infrastructure 105 may be owned or operated by one or more enterprises different than the enterprise which operates the IT asset development platform 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding their product development lifecycles, specifications/requirements, etc., which may be used for predicting defect-prone areas or components of the IT assets 106. The host agents may also be configured to receive, from the IT asset development platform 110, notifications regarding predicted defect-prone areas of the IT assets 106 and potential precautionary or remedial measures to take to prevent or provide earlier identification of defects in such defect-prone areas of the IT assets 106. It should be noted that a "host agent" as this term is generally used herein may comprise an automated entity, such as a software entity running on a processing device. Accordingly, a host agent need not be a human entity.

The IT asset development platform 110 in the FIG. 1 embodiment is assumed to be implemented using at least one processing device. Each such processing device generally comprises at least one processor and an associated memory, and implements one or more functional modules or logic for controlling certain features of the IT asset development platform 110. In the FIG. 1 embodiment, the IT asset development platform 110 implements IT asset specification analysis logic 112, IT asset defect analysis logic 114, and machine learning-based defect-prone component prediction logic 116. The IT asset specification analysis logic 112 is configured to categorize different IT asset specifications (also referred to as "requirements"). This may involve keyword analysis of historical asset specification descriptions to train an asset categorization machine learning model to categorize, based on a given asset specification description for a given asset specification, categories associated with the given asset specification. The IT asset defect analysis logic 114 is configured to categorize different defects. This may involve keyword analysis of historical defect descriptions to train a defect categorization machine learning model to categorize, based on a given defect description for a given defect, categories associated with the given defect.

The machine learning-based defect-prone component prediction logic 116 is configured to map or associate historical asset specifications and defects based at least in part on the determined categories of the historical asset specifications and defects to determine defect-prone IT asset specifications (e.g., historical asset specifications which have associated historical defects). The machine learning-based defect-prone component prediction logic 116 is further configured to utilize a defect-prone component prediction machine learning model to predict, for a given IT asset specification, whether the given IT asset specification is "defect-prone" using the mappings or associations between the historical asset specifications and defects. The machine learning-based defect-prone component prediction logic 116 is configured, responsive to identifying the given IT asset specification as defect-prone, to identify components of a given IT asset which are associated with the given IT asset specification. If the given IT asset is a software product, the identified components may include software components (e.g., particular pages, sections or functionality of the software product) which are associated with the given IT asset specification. If the given IT asset is a hardware product, the identified components may include hardware components (e.g., memory, storage, processors, network interface cards, displays, peripherals, etc.) which are associated with the given IT asset specification. Notifications may be generated and provided to authorized users or personnel (e.g., of the client devices 102) for taking precautionary measures during the product development lifecycle to either prevent defects in such defect-prone areas or provide for earlier identification of any defects in such defect-prone areas.

At least portions of the IT asset specification analysis logic 112, the IT asset defect analysis logic 114, and the machine learning-based defect-prone component prediction logic 116 may be implemented at least in part in the form of software that is stored in memory and executed by a processor.

The IT asset development platform 110 and other portions of the information processing system 100, as will be described in further detail below, may be part of cloud infrastructure.

The IT asset development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the IT asset database 108 and the IT asset development platform 110 or components thereof (e.g., the IT assets 106, the IT asset specification analysis logic 112, the IT asset defect analysis logic 114, and the machine learning-based defect-prone component prediction logic 116) may be implemented on respective distinct processing platforms, although numerous other arrangements are possible. For example, in some embodiments at least portions of the IT asset development platform 110 and one or more of the client devices 102, the IT infrastructure 105 and/or the IT asset database 108 are implemented on the same processing platform. A given client device (e.g., 102-1) can therefore be implemented at least in part within at least one processing platform that implements at least a portion of the IT asset development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the IT asset database 108 and the IT asset development platform 110, or portions or components thereof, to reside in different data centers. Numerous other distributed implementations are possible. The IT asset development platform 110 can also be implemented in a distributed manner across multiple data centers.

Additional examples of processing platforms utilized to implement the IT asset development platform 110 and other components of the information processing system 100 in illustrative embodiments will be described in more detail below in conjunction with FIGS. 11 and 12.

It is to be appreciated that these and other features of illustrative embodiments are presented by way of example only, and should not be construed as limiting in any way.

It is to be understood that the particular set of elements shown in FIG. 1 for machine-learning based prediction of defect-prone components of IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine-learning based prediction of defect-prone components of IT assets will now be described in more detail with reference to the flow diagram of FIG. 2. It is to be understood that this particular process is only an example, and that additional or alternative processes for machine-learning based prediction of defect-prone components of IT assets may be used in other embodiments.

In this embodiment, the process includes steps 200 through 206. These steps are assumed to be performed by the IT asset development platform 110 utilizing the IT asset specification analysis logic 112, the IT asset defect analysis logic 114, and the machine learning-based defect-prone component prediction logic 116. The process begins with step 200, determining one or more specifications for an IT asset to be developed. Such specifications, also referred to as requirements, may indicate functionality to be provided in the to-be-developed IT asset. The IT asset may comprise a software product, and the one or more components of the IT asset may comprise one or more software components of the software product, such as one or more functions of the software product. The IT asset may comprise a hardware product, and the one or more components of the IT asset may comprise at least one of one or more hardware components of the hardware product and one or more software components running on the one or more hardware components of the hardware product.

Figure 2:
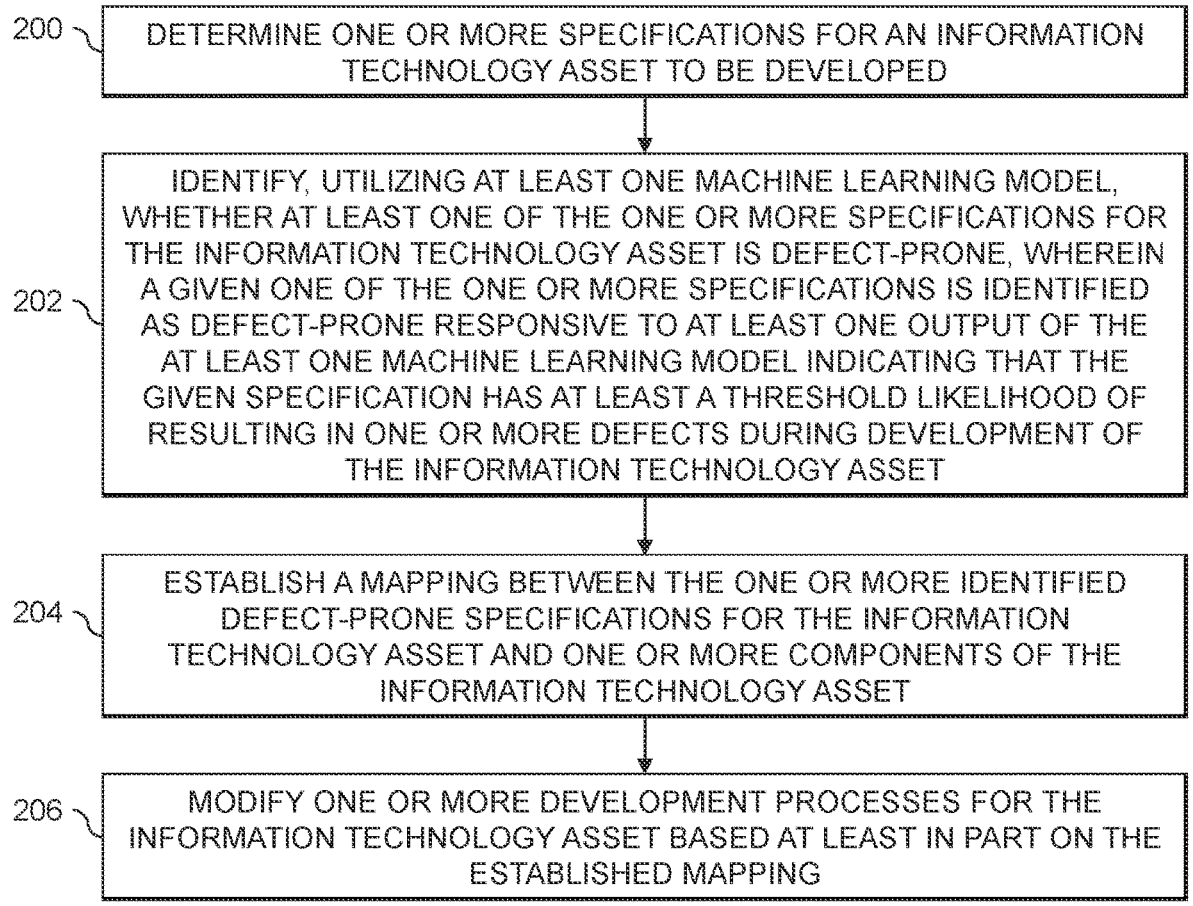
FIG. 2 is a flow diagram of an exemplary process for machine-learning based prediction of defect-prone components of information technology assets in an illustrative embodiment.

The FIG. 2 process continues with step 202, identifying, utilizing at least one machine learning model, whether at least one of the one or more specifications for the IT asset is defect-prone. A given one of the one or more specifications is identified as defect-prone responsive to at least one output of the at least one machine learning model indicating that the given specification has at least a threshold likelihood of resulting in one or more defects during development of the IT asset. In step 204, a mapping is established between the one or more identified defect-prone specifications for the IT asset and one or more components of the IT asset. One or more development processes for the IT asset are modified in step 206 based at least in part on the mapping established in step 204.

The at least one machine learning model may comprise at least one classification model, trained on (i) descriptions for historical IT asset specifications in a historical IT asset specification dataset and (ii) descriptions for historical defects in a historical defect dataset, configured to determine one or more categories for an input IT asset specification based at least in part on keywords in a description of the input IT asset specification. The at least one classification model may comprise a Naïve Bayes classifier. The FIG. 2 process may further include merging the historical IT asset specification dataset and the historical defect dataset to create a merged dataset, the merged dataset comprising, for each of the historical IT asset specifications, a prone to defect value indicating whether that historical IT asset specification is associated with one or more of the historical defects. The at least one machine learning model may further comprise at least one prediction model, trained utilizing the merged dataset, configured to identify the defect-prone ones of the one or more specifications for the IT asset. The prediction model may comprise a Naïve Bayes classifier and a logistic regression model. The Naïve Bayes classifier accounts for a probabilistic nature of features associated with the one or more specifications for the IT asset and independence between the features associated with the one or more specifications for the IT asset, and the logistic regression model accounts for underlying relationships between the features associated with the one or more specifications for the IT asset. The prediction model may comprise an ensemble model combining outputs of the Naïve Bayes classifier and the logistic regression model. Step 202 may comprise identifying the one or more defect-prone specifications for the IT asset based at least in part on a weighted combination of outputs of the Naïve Bayes classifier and the logistic regression model.

Step 206 may comprise increasing allocation of resources for development teams performing the one or more development processes for the one or more components of the IT asset which are mapped to the one or more identified defect-prone specifications for the IT asset. Step 206 may also or alternatively comprise delivering one or more notifications to product development teams performing the one or more development processes indicating the one or more components of the IT asset which are mapped to the one or more identified defect-prone ones of the specifications for the IT asset.

In a product development lifecycle (e.g., for IT assets), finding and fixing defects is an expensive activity, both in terms of time required and cost. The cost may grow exponentially if defects are detected late in the product development lifecycle, which may impact subsequent phases as well. In an early detection policy, most of the defects are discovered and reworked locally (e.g., during the same activity that injected them). In a late detection policy, most of the corrections are not performed locally and are instead performed during testing phases which contributes to more time and effort in the testing phases.

Illustrative embodiments provide technical solutions for applying machine learning methods in product development lifecycles (e.g., for software development or other types of IT assets) for predicting defect-prone components of IT assets, enabling corrective measures to be taken in earlier stages of the product development lifecycles (e.g., during code writing or development in development environments, rather than testing in integration testing environments). The technical solutions described herein perform association of existing defects and specifications/requirements for IT assets, to generate patterns which in turn identify vulnerable areas in IT assets. In some embodiments, the IT asset comprises an application or other piece of software. In other embodiments, the IT asset comprises hardware, or combinations of hardware and software. Predicting defect-prone components of IT assets is performed in some embodiments by building machine learning models which utilize historical defects and requirements to recommend or identify defect-prone areas of IT assets. Using such information regarding defect-prone areas of the IT assets, the technical solutions are able to find potentially expensive defects in earlier stages of product development lifecycles.

In some embodiments, machine learning methods are applied in software development for defect prediction in order to take corrective measures in the early stages of product development lifecycles of software product. Existing defects and specifications/requirements are associated with one another through application of machine learning models that generate patterns used in identifying vulnerable areas in an application or other piece of software. Such vulnerable areas comprise recommendations of defect-prone areas, and therefore expensive defects tend to be found in the early stages of product development lifecycles.

For an application or other piece of software to be enabled in production, it involves back and forth interactions among multiple entities, including a first team (e.g., a quality assurance (QA) team) that validates if the application meets quality standards and a second team (e.g., a development team) that is working on development of the application for end-users. The development team provides the code and the installable files of the application to the QA team. Users from the quality assurance team then look for a set of things in the application to ensure that it meets applicable quality standards and guidelines.

Conventional approaches suffer from various technical problems, including delays in the QA process. There have been occurrences in the past when a given application is due to go to production, but due to late detection policies, most corrections are not performed locally but instead during testing phases which contributes to more time and effort in the testing phases. This leads to further impacts, such as the given application's availability for end-users being delayed. In addition, finding and fixing defects is an expensive activity with respect to time and cost, and the cost may grow exponentially if defects are detected late in the cycle. Such late-identified defects can also influence subsequent phases in the product development lifecycle. Further technical problems are associated with human intervention for early defect detection. Manual inspection may be a first line of defense in early inspection and verification processes, but has issues related to unreliability and precision. This is applicable for both manual and automation testing, which results in possibly missing regression bugs and quality standards.

The technical solutions described herein provide functionality for validating any kind of application or other piece of software (or more generally, an IT asset) that reaches a governing body for quality approval against a preset guideline of regression and quality checks from a code, specification/requirement and user experience (UX) standpoint. The technical solutions are able to optimize the overall process of the software or other product development lifecycle by reducing the delay caused by manual processes, and provide functionality for scanning through historical defects and requirements to recommend or identify defect-prone areas of IT assets. This advantageously enables expensive defects to be found in early stages of the product development lifecycle. As discussed above, in a product development lifecycle process for finding and fixing defects are expensive (e.g., with respect to time, cost, etc.), and this cost may grow exponentially if defects are detected late in the product development lifecycle and can have effects on subsequent phases of the product development lifecycle.

Using an early detection policy allows for most defects to be discovered and reworked "locally," or during the same activity that injected them. When a late detection policy is used, most corrections are not performed locally and are instead performed during testing phases which contributes to more time and increased efforts during the testing phase. The technical solutions described herein provide a novel approach for applying machine learning methods in IT asset development in order to predict defects (e.g., defect-prone areas or components of IT assets) in order to take corrective measures in earlier stages of the product development lifecycle. To do so, some embodiments utilize machine learning models to associate existing defects and specifications/requirements to generate patterns that can be used to identify vulnerable (e.g., defect-prone) areas in IT assets. The machine learning models utilize historical defect and specification/requirement information to recommend or otherwise identify defect-prone areas of IT assets in order to facilitate finding potentially expensive defects in earlier stages of the product development lifecycle.

In some embodiments, IT asset specifications or requirements as well as defects are categorized utilizing machine learning models. Such machine learning models may utilize various inputs or parameters. For specifications/requirements, the inputs or parameters may include: a specification/requirement identifier (ID); a specification/requirement description; a sprint ID (e.g., an identification of a time-based period in which a development team works to complete a set amount of work); environments; associated test cases; associated defects; categories (e.g., user interface (UI), database (DB), infrastructure, etc.); impacted areas of the software or other IT asset (e.g., login page, pricing, account information, etc.); etc. For defects/incidents, the inputs or parameters may include: defect/incident ID; defect/incident description; sprint ID; environments; whether detected in test phase; steps for reproducing the defect/incident; associated specifications/requirements; associated test cases; categories (e.g., UI, DB, infrastructure, etc.); impacted areas of the software or other IT asset (e.g., login page, pricing, account information, etc.); etc.

Figure 3:
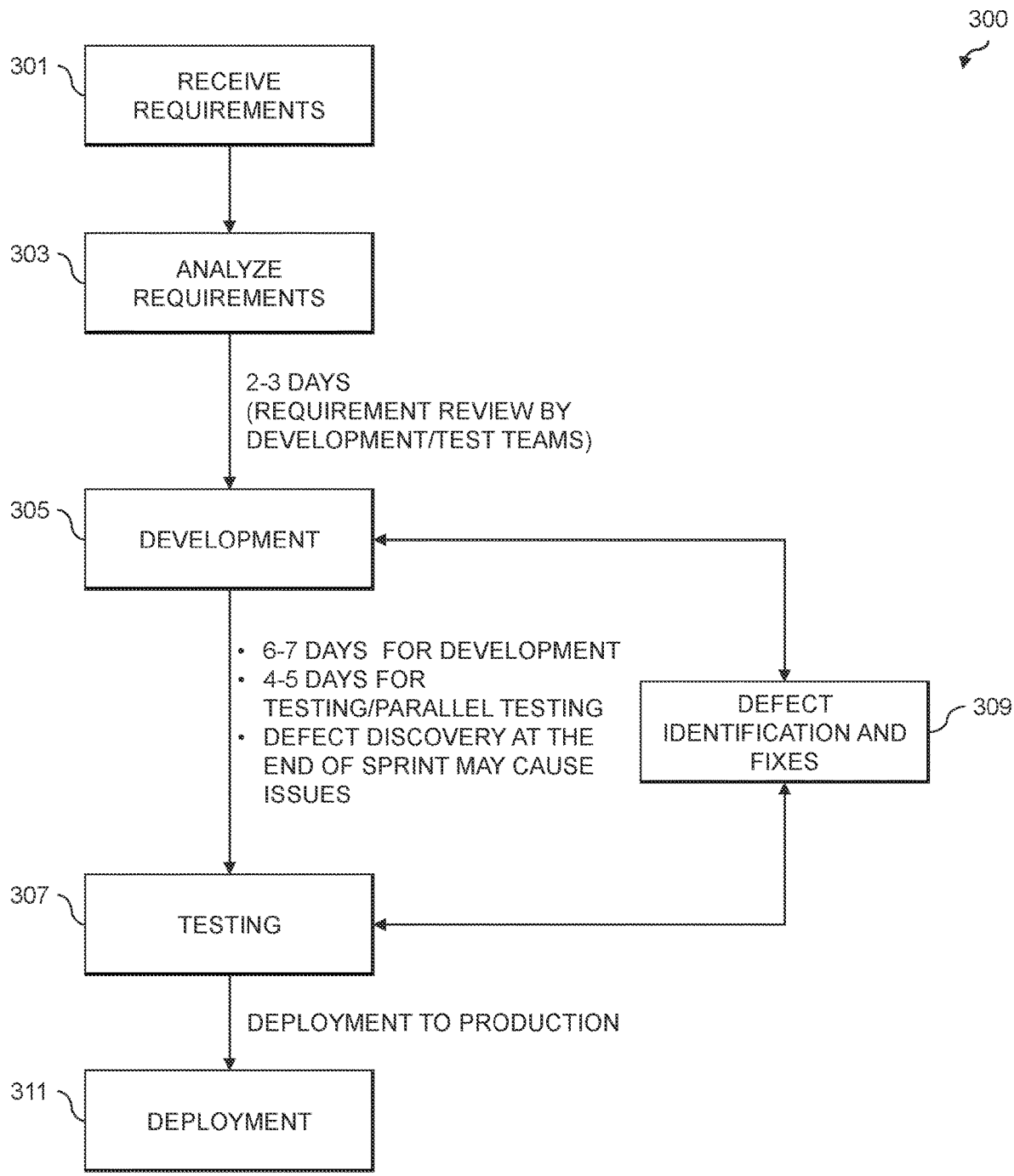
FIG. 3 shows a process flow for a software development sprint cycle in an illustrative embodiment.

FIG. 3 shows a process flow 300 for a software development sprint cycle, which includes steps of receiving requirements 301, analyzing the requirements 303, development 305, testing 307, defect identification and fixes 309, and deployment 311. Each sprint cycle may include a fixed amount of time (e.g., two weeks). At the end of each sprint cycle, the goal is to provide a working version of a given piece of software. The overall process flow 300 may take about two weeks for appropriate development and QA teams to review the application, including 2-3 days for development/test teams to review the requirements, 6-7 days for development 305 and 4-5 days for testing 307 (where the development 305 and testing 307 may include time for defect identification and fixes 309), before deployment 311 to production.

Figure 4:
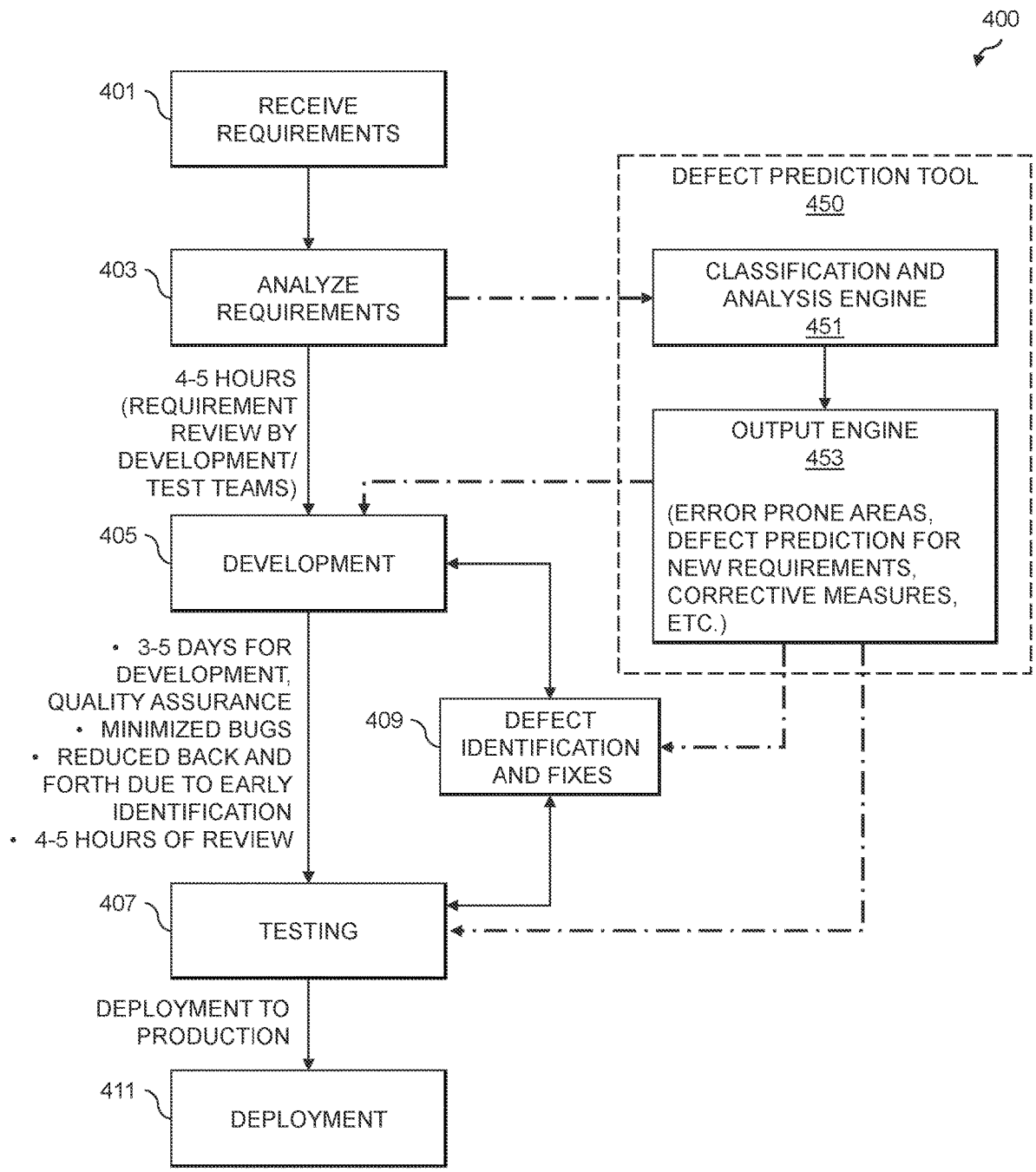
FIG. 4 shows a process flow for a software development sprint cycle utilizing a defect prediction tool in an illustrative embodiment.

FIG. 4 shows a process flow 400 for a software development sprint cycle which utilizes a defect prediction tool 450 to facilitate earlier detection/prevention of defects in predicted defect-prone areas or components of the software being developed. The process flow 400, similar to the process flow 300, includes steps of receiving requirements 401, analyzing the requirements 403, development 405, testing 407, defect identification and fixes 409, and deployment 411. The process flow 400, however, also utilizes the defect prediction tool 450 (implementing a classification and analysis engine 451 and an output engine 453) which can reduce the turnaround time for various steps, including analyzing requirements 403, development 405, testing 407, and defect identification and fixes 409. For example, the turnaround time for analyzing requirements 403 may be reduced to 4-5 hours (e.g., from 2-3 days as in process flow 300), and the turnaround time for development 405, testing 407 and defect identification and fixes 409 may be reduced to 3-5 days (e.g., from the 10-12 days in the process flow 300). This is due to use of the defect prediction tool 450, which can validate and predict the quality for various software (e.g., a suite of applications) using the classification and analysis engine 451, which analyzes the requirements of the software being developed as well as historical requirements and defect/incident data to generate outputs which are provided from the output engine 453 for use in development 405, testing 407 and defect identification and fixes 409. Such outputs may include identification of defect-prone areas of software, defect predictions for new requirements, suitable test cases and potential corrective measures, etc. The defect prediction tool 450 can advantageously minimize bugs in the software, as well as reduce the back-and-forth required (e.g., between development 405, testing 407 and defect identification and fixes 409) due to prevention and earlier identification of defects.

Figure 5A:
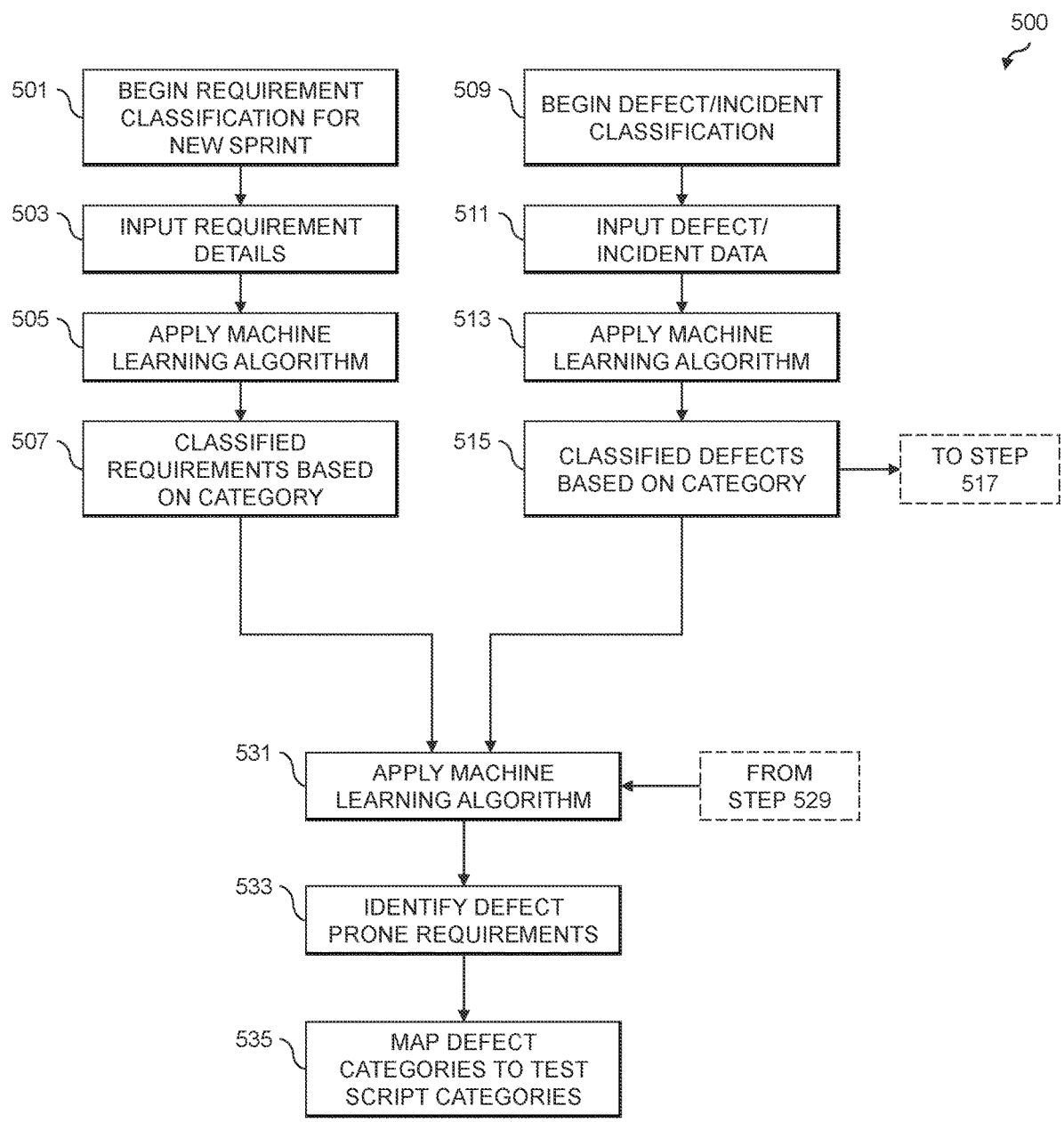
FIGS. 5A and 5B show a workflow implemented by a defect prediction tool in an illustrative embodiment.
Figure 5B:
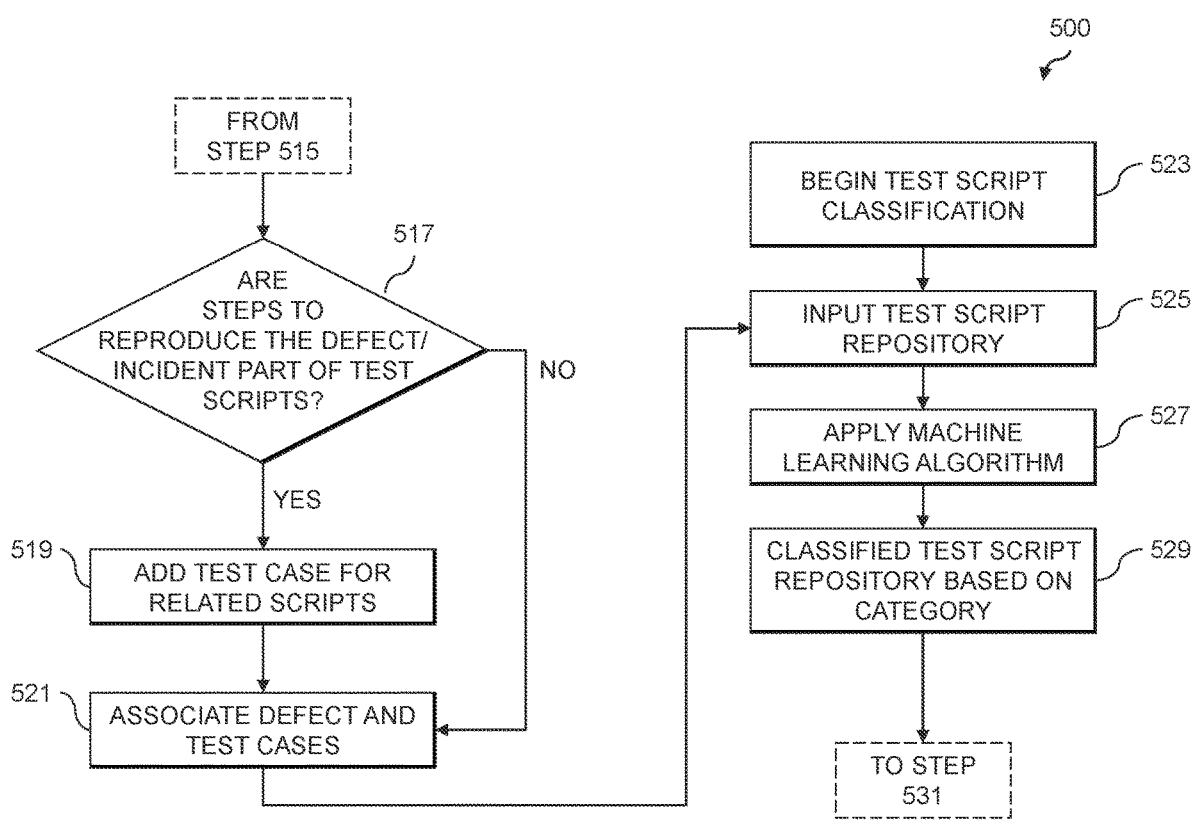

FIGS. 5A and 5B show a workflow 500 which may be implemented by the defect prediction tool 450. As shown in FIG. 5A, the workflow 500 begins with specification/requirement classification 501 for a new software development sprint cycle and continues with inputting specification/requirement details 503 and applying a machine learning algorithm 505 to the input specification/requirement details to generate an output 507 of classified specifications/requirements for a piece of software. The classified specifications/requirements may be based on a set of categories. The workflow 500 also includes beginning defect/incident classification 509, followed by inputting defect/incident data 511 and applying a machine learning algorithm 513 to generate an output 515 of classified defects. The classified defects may be based on a set of categories (e.g., which may be the same as the set of categories used in classifying the specifications/requirements).

As shown in FIG. 5B, the output 515 may be analyzed in step 517 to determine whether there are steps to reproduce the classified defects which are part of existing test scripts. If the result of the step 517 determination is yes, the workflow 500 proceeds with adding the test case for the related existing test scripts in step 519. Following step 519, or if the result of the step 517 determination is no, the workflow 500 proceeds with associating the classified defects with one or more test cases in step 521. The workflow 500 further includes beginning test script classification in step 523, followed by inputting a test script repository in step 525. The test script repository input in step 525 may include or take into account the association of classified defects and test cases from step 521. The workflow 500 then proceeds with applying a machine learning algorithm in step 527 to the test script repository to generate an output 529 of classified test scripts. The classified test scripts may be based on a set of categories (e.g., which may be the same as the set of categories used in classifying the specifications/requirements as well as the defects/incidents).

Returning to FIG. 5A, the outputs 507, 515 and 529 may be used for applying a machine learning algorithm in step 531 to identify defect-prone requirements for the piece of software in step 533. In step 535, a mapping may be generated between one or more defect categories and one or more test script categories (e.g., for the identified defect-prone requirements for the piece of software).

FIGS. 6A and 6B show respective portions of pseudocode 600-1 and 600-2 (collectively, pseudocode 600) which may be used to implement the workflow 500 of FIGS. 5A and 5B. FIG. 7 shows a table 700 of sample output data from the pseudocode 600. The table 700 includes columns for a specification/requirement ID, a specification/requirement description, a predicted category, whether the specification/requirement is prone to defects, and associated defect history.

Figure 8:
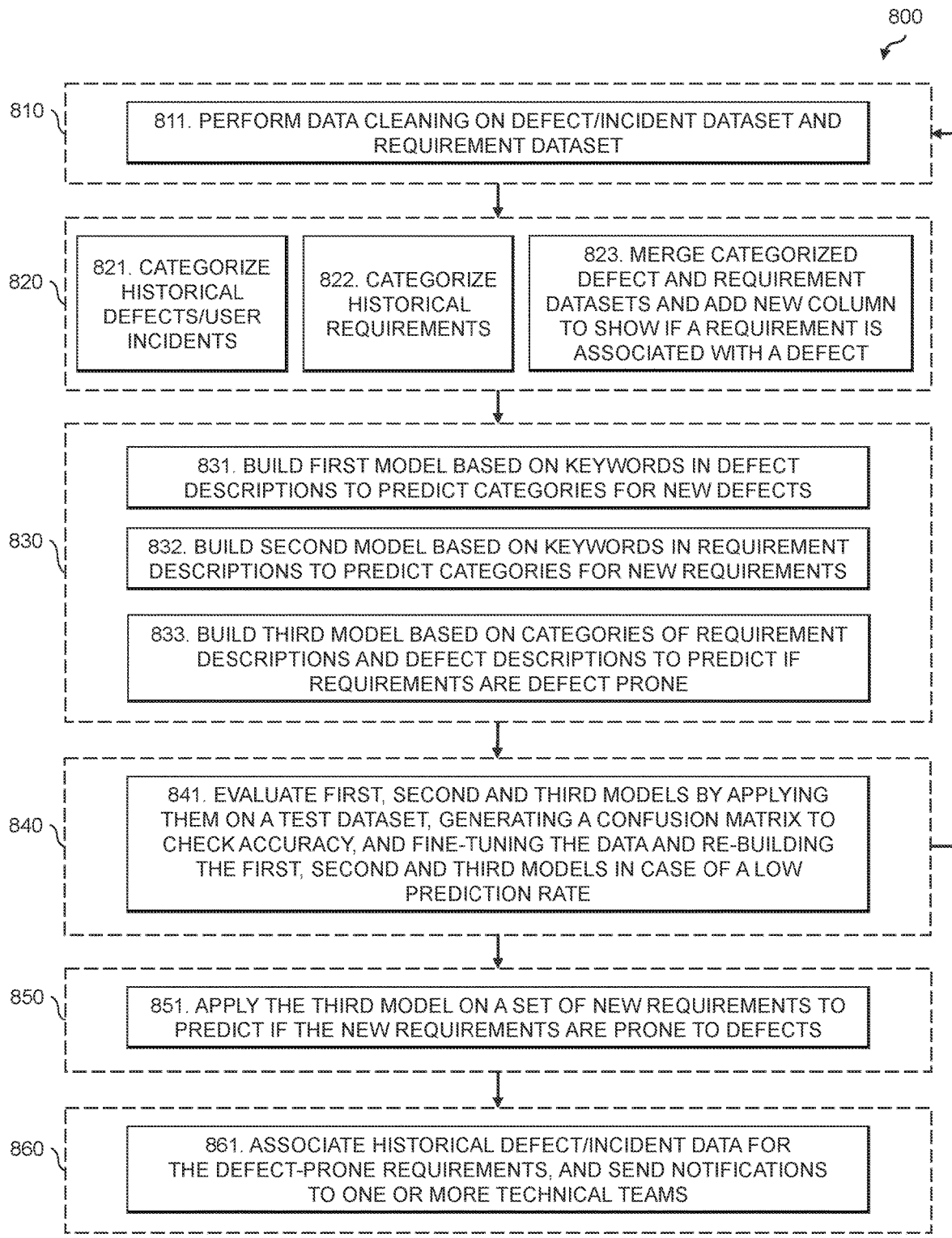
FIG. 8 shows a process flow for predicting defect-prone areas of information technology assets in an illustrative embodiment.

FIG. 8 shows a system flow 800 for building and applying a defect prediction model. The system flow 800 includes a set of stages 810, 820, 830, 840, 850 and 860. In stage 810, data cleaning is performed in step 811 on a defect/incident dataset and a specification/requirement dataset. The data cleaning may include various processing, including but not limited to imputing missing data, managing outliers, fixing data types, etc. In stage 820, historical defects and user incidents are classified in step 821, historical specifications/requirements are classified in step 822, and the categorized or classified defect and specification/requirement datasets are merged to create a merged dataset in step 823. The merged dataset includes a new column not present in the individual defect/incident dataset or the specification/requirement dataset. The new column indicates or shows whether historical specifications/requirements are associated with historical defects/incidents.

In stage 830, a first machine learning model is built in step 831 based on keywords in defect descriptions of the defect/incident dataset to predict categories for new defects. A second machine learning model is built in step 832 based on keywords in specification/requirement descriptions of the specification/requirement dataset to predict categories for new requirements. A third machine learning model is built in step 833 based on the specification/requirement and defect description categories to predict whether specifications/requirements are defect-prone. In stage 840, the first, second and third machine learning models are evaluated by applying them on a test dataset, followed by generating a confusion matrix to check accuracy and fine-tuning the data. The first, second and/or third machine learning models may be rebuilt in the case of a low prediction rate on the test dataset in step 841. Thus, stage 840 may return or loop back to stage 810 if needed. In stage 850, the third machine learning model is applied on a set of new specifications/requirements in step 851 to predict if the new specifications/requirements are prone to defects. In stage 860, historical defect/incident data is associated with the defect-prone specifications/requirements and notifications are sent to one or more technical teams in step 861.

Figure 9:
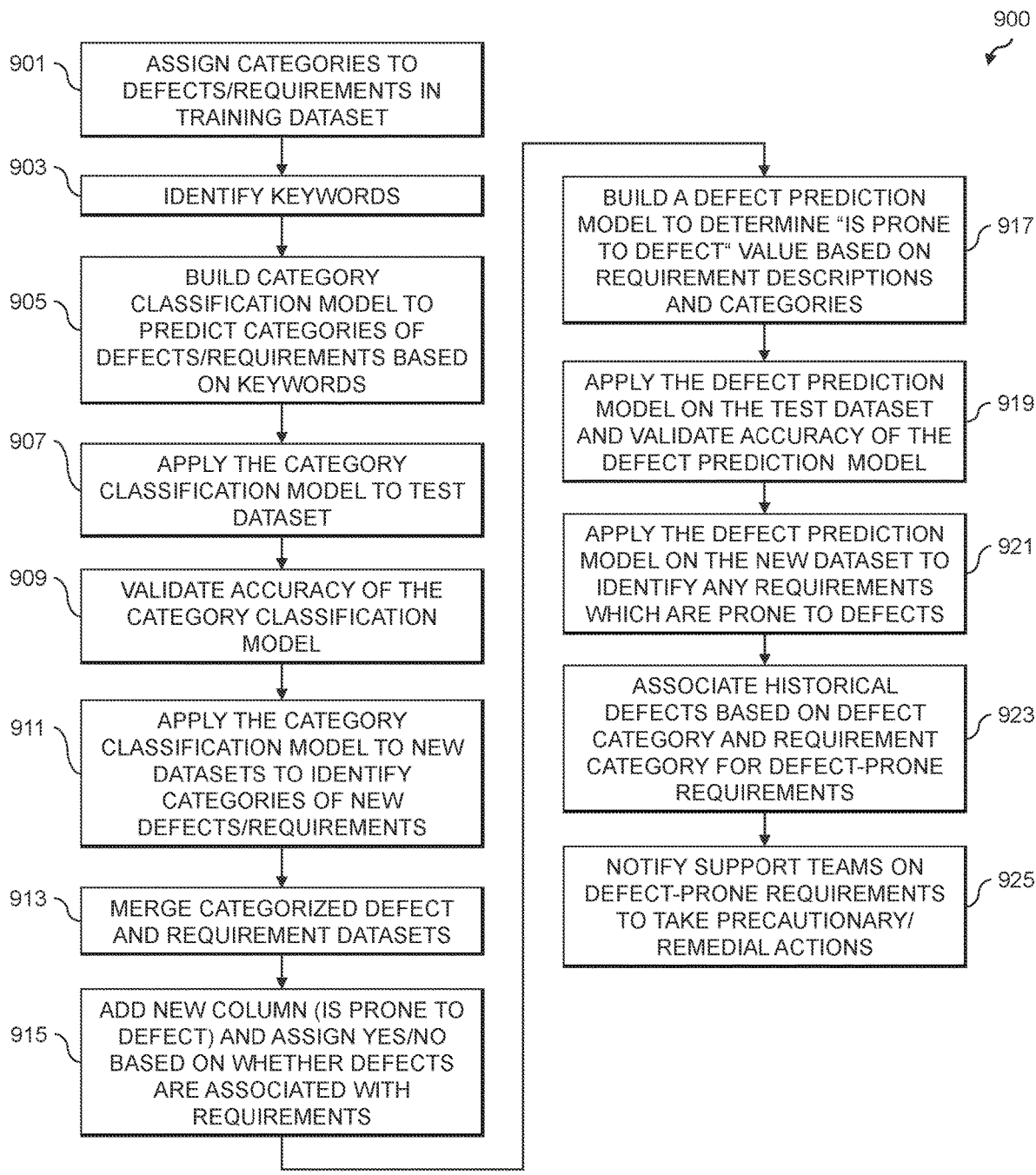
FIG. 9 shows another process flow for predicting defect-prone areas of information technology assets in an illustrative embodiment.

FIG. 9 shows a process flow 900 for categorizing defects and specifications/requirements, and for building and applying a predictive machine learning model to identify defect-prone areas of IT assets (e.g., software/hardware products). The process flow 900 begins with assigning categories to defects and specifications/requirements in a training dataset in step 901. FIG. 10 shows a table 1000 of a test dataset including historical defects and specifications/requirements in a merged format, including columns for the specification/requirement ID, specification/requirement description, specification/requirement category (e.g., software, services, hardware, etc.), associated defect ID, defect description, and the actual and predicted association between specifications/requirements and defects. The specification/requirement categories shown in the table 1000 of FIG. 10 are examples of the categories which may be defined as part of step 901 in the process flow 900.

The process flow 900 continues in step 903 with identifying keywords to build a repository. Step 903 may include obtaining a keyword repository from a database, manually identifying keywords, applying natural language processing (NLP) to defect and requirement descriptions, etc. In step 905, one or more category classification machine learning models are built to predict categories (e.g., of defects and specifications/requirements) based on the keywords identified in step 903. To build the category classification machine learning models, the probability of occurrent of each keyword in different categories is calculated (e.g., using a probabilistic classifier algorithm). This is an automated process, as the probabilistic classifier predicts based on the probability of an object. Here, the probability of keyword occurrence in the training dataset (e.g., defect and specification/requirement training datasets) is calculated. The expected output will be the probability of keyword occurrence in the training dataset. The structure of the classifier may include feeding training data into a Naïve Bayes classifier which learns the prior probability and likelihood of each class. The prior probability is the probability of a certain class occurring in the data, and the likelihood is the probability of a certain feature given a class. Once the classifier is trained, it can be used to classify new instances of data based on the prior probability and the likelihood learned from the training data. The classifier will calculate the probability of each class for a new instance of data based on the prior probability and likelihood learned from the training data. The classifier will calculate the probability of each class for a new instance of data, and the class with the highest probability will be the predicted class.

In step 907, the category classification machine learning model is applied on the test dataset and evaluated. For example, given a defect description input text of "Refund is processed after 7 days, while it should have been processed 3 days after cancellation," the keywords may be ['Refund', 'Process', 'Cancellation']. Based on the probability of occurrence of each keyword, this defect will be assigned to a "pricing" category. The accuracy of the category classification machine learning model is validated in step 909. Based on this validation, data cleaning may be performed and the category classification machine learning model may be rebuilt (e.g., until a desired level of accuracy is achieved). Mean, median, mode or classifiers may be used to impute the data, and this activity may be carried out each time a new dataset is fed into the algorithm.

The category classification machine learning model, after validation in step 909, is applied to new defect and specification/requirement datasets in step 911 to identify categories of the new defects and/or specifications/requirements in the new defect and specification/requirement datasets. The categorized defects and specifications/requirements are then merged in step 913, providing a merged dataset. The merged dataset may be created by joining the new specification/requirement and defect datasets using the specification/requirement ID as a key. A new column is added in step 915, indicating whether particular specifications/requirements are prone to defects ('is prone to defect'). In this new column, a value of "yes" is assigned if any defects are associated with a given specification/requirement and a value of "no" is assigned if no defect is associated with the given specification/requirement. This merged dataset is then used as a training dataset for building a defect prediction machine learning model in step 917, with the defect prediction machine learning model being configured to predict or otherwise determine the "is prone to defect" value based on specification/requirement descriptions and categories. The defect prediction machine learning model utilizes a combination of the specification/requirement descriptions and the specification/requirement categories in order to predict the value for the "is prone to defect" column. The table 1000 of FIG. 10 shows an example of a training dataset for the defect prediction machine learning model.

The defect prediction machine learning model may be built in step 917 by creating a hybrid model that combines a Naïve Bayes classifier and a logistic regression model. The logistic regression model can be used to capture the underlying relationships between the input features and the output, while the Naïve Bayes classifier can be used to account for the probabilistic nature of the data and the independence assumptions between features. In some embodiments, an ensemble system is utilized that combines the results of the Naïve Bayes classifier and the logistic regression model. Another approach is to use the Naïve Bayes classifier and the logistic regression model in parallel, and use the output probability of each to weight the final decision. For example, if the logistic regression model's probability for a given class is 0.6 and the Naïve Bayes classifier's probability for a given class is 0.8, the final decision for the given class may be 0.7 (e.g., with equal weightings applied to the outputs of the logistic regression model and the Naïve Bayes classifier). If desired, the output of the logistic regression model may be weighted higher than the output of the Naïve Bayes classifier, or vice versa.

In step 919, the defect prediction machine learning model is applied on the test dataset to validate the accuracy of the defect prediction machine learning model. Once validated, the defect prediction machine learning model may be applied in step 921 to the new dataset to identify any specifications/requirements (in the new dataset) which are prone to defects. In step 923, historical defects are associated with defect-prone requirements, based on the defect categories of the historical defects and the specification/requirement categories of the defect-prone specifications/requirements. In step 925, support teams (e.g., development/testing teams, QA teams) are notified of the defect-prone specifications/requirements to take precautionary or remedial actions to identify and fix defects in earlier stages of the product development lifecycle. Step 925 may include publishing a prediction report along with associated historical data, to enable the support teams to take the precautionary measures during the product development lifecycle. For example, developers may be made aware of defect-prone specifications/requirements and thus may take special care when implementing the defect-prone specifications/requirements to avoid resulting defects in a given IT asset being developed.

The technical solutions described herein advantageously provide approaches for building machine learning models that predict defect-prone areas or portions of IT assets, and provide data cleaning techniques which may be applied prior to training and testing. IT asset specifications/requirements may be used as an input, and the requirements/specifications and defects are processed to ensure highest traceability throughout the product development lifecycle. The technical solutions provide a novel approach for defining the underlying relationships between input features (e.g., IT asset specifications/requirements) and the output, in order to identify the categories of IT asset specifications/requirements and defects. In some embodiments, a probabilistic classifier is used for predicting defect-prone areas of IT assets (e.g., using a labeled dataset). The predictions of defect-prone areas of IT assets are further utilized in various stages of the product development lifecycle, dramatically reducing the cycle-time for defect identification and fixes through identifying the defect-prone areas within an IT asset and leveraging such knowledge during development and testing of the IT asset. In some embodiments, keywords are provided utilizing domain expert knowledge, with such keywords being utilized to build machine learning models which extract and convert them into findings (e.g., categories of defects and specifications/requirements), such that the machine learning models provide more accurate results which are consistent with how domain experts want testing to be carried out.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine-learning based prediction of defect-prone components of IT assets will now be described in greater detail with reference to FIGS. 11 and 12. Although described in the context of system 100, these platforms may also be used to implement at least portions of other information processing systems in other embodiments.

Figure 11:
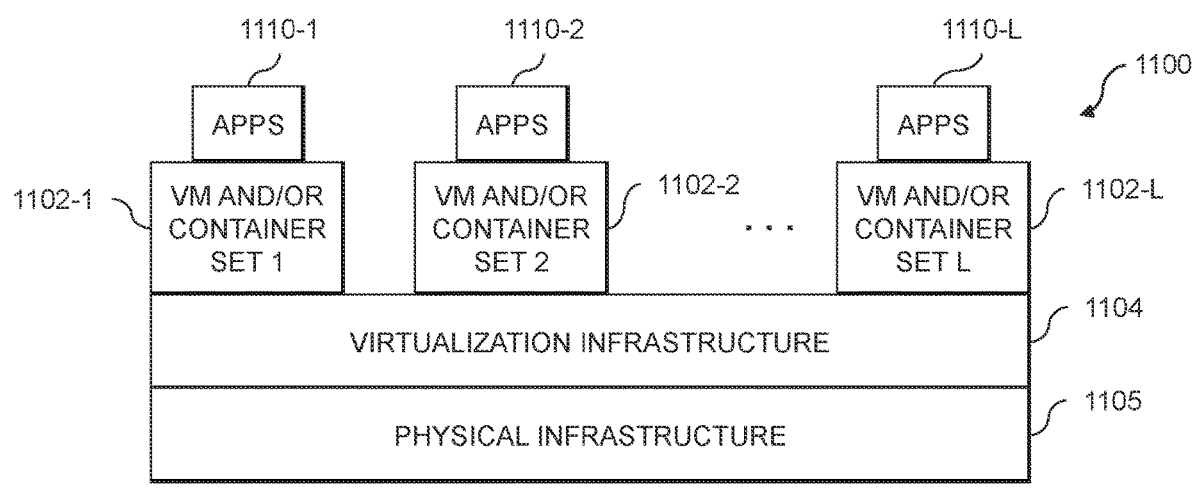
FIGS. 11 and 12 show examples of processing platforms that may be utilized to implement at least a portion of an information processing system in illustrative embodiments.
Figure 12:
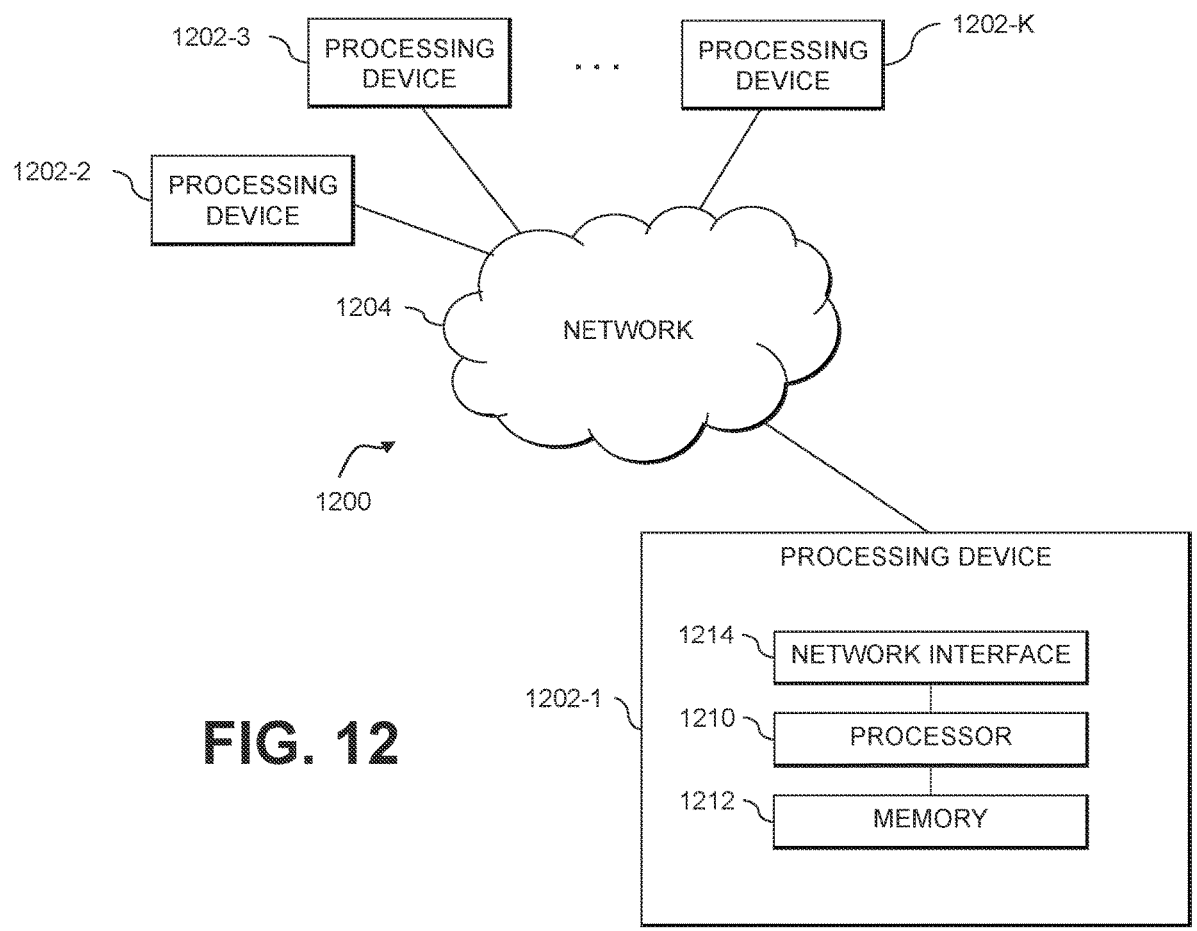

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, ... 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, ... 1110-L running on respective ones of the VMs/container sets 1102-1, 1102-2, ... 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, ... 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine-learning based prediction of defect-prone components of IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to determine one or more specifications for an information technology asset to be developed;
to identify, utilizing at least one machine learning model, whether at least one of the one or more specifications for the information technology asset is defect-prone, wherein a given one of the one or more specifications is identified as defect-prone responsive to at least one output of the at least one machine learning model indicating that the given specification has at least a threshold likelihood of resulting in one or more defects during development of the information technology asset;
to establish a mapping between the one or more identified defect-prone specifications for the information technology asset and one or more components of the information technology asset; and
to modify one or more development processes for the one or more components of the information technology asset that are mapped to the one or more identified defect-prone specifications;
wherein modifying the one or more development processes for the one or more components of the information technology asset comprises:
determining defect categories for the one or more identified defect-prone specifications for the information technology asset;
selecting, from a test script repository, one or more test scripts associated with one or more test cases utilized for the determined defect categories for one or more historical development processes to be utilized for testing the one or more components of the information technology asset mapped to the one or more identified defect-prone specifications;
applying the selected one or more test scripts as part of one or more testing processes during the one or more development processes for the information technology asset to identify one or more defects in the one or more components of the information technology asset that are mapped to the one or more identified defect-prone specifications; and
applying one or more fixes to correct the identified one or more defects in the one or more components of the information technology asset that are mapped to the one or more identified defect-prone specifications.

2. The apparatus of claim 1 wherein the information technology asset comprises a software product, and wherein the one or more components of the information technology asset comprise one or more software components of the software product.

3. The apparatus of claim 2 wherein the one or more software components of the software product comprise one or more functions of the software product.

4. The apparatus of claim 1 wherein the information technology asset comprises a hardware product, and wherein the one or more components of the information technology asset comprise at least one of one or more hardware components of the hardware product and one or more software components running on the one or more hardware components of the hardware product.

5. The apparatus of claim 1 wherein the at least one machine learning model comprises at least one classification model, trained on (i) descriptions for historical information technology asset specifications in a historical information technology asset specification dataset and (ii) descriptions for historical defects in a historical defect dataset, configured to determine one or more categories for an input information technology asset specification based at least in part on keywords in a description of the input information technology asset specification.

6. The apparatus of claim 5 wherein the at least one classification model comprises a Naïve Bayes classifier.

7. The apparatus of claim 5 wherein the at least one processing device is further configured to merge the historical information technology asset specification dataset and the historical defect dataset to create a merged dataset, the merged dataset comprising, for each of the historical information technology asset specifications, a prone to defect value indicating whether that historical information technology asset specification is associated with one or more of the historical defects.

8. The apparatus of claim 7 wherein the at least one machine learning model further comprises at least one prediction model, trained utilizing the merged dataset, configured to identify whether the at least one of the one or more specifications for the information technology asset is defect-prone.

9. The apparatus of claim 1 wherein the at least one machine learning model comprises a Naïve Bayes classifier and a logistic regression model.

10. The apparatus of claim 9 wherein the Naïve Bayes classifier accounts for a probabilistic nature of features associated with the one or more specifications for the information technology asset and independence between the features associated with the one or more specifications for the information technology asset, and wherein the logistic regression model accounts for underlying relationships between the features associated with the one or more specifications for the information technology asset.

11. The apparatus of claim 9 wherein the at least one machine learning model comprises an ensemble model combining outputs of the Naïve Bayes classifier and the logistic regression model.

12. The apparatus of claim 9 wherein identifying whether the at least one of the one or more specifications for the information technology asset is defect-prone is based at least in part on a weighted combination of outputs of the Naïve Bayes classifier and the logistic regression model.

13. The apparatus of claim 1 wherein modifying the one or more development processes for the one or more components of the information technology asset that are mapped to the one or more identified defect-prone specifications comprises increasing allocation of resources for development teams performing the one or more development processes for the one or more components of the information technology asset that are mapped to the one or more identified defect-prone specifications for the information technology asset relative to resources allocated for development teams performing one or more development processes for one or more other components of the information technology asset that are not mapped to the one or more identified defect-prone specifications.

14. The apparatus of claim 1 wherein the at least one processing device is further configured to deliver one or more notifications to product development teams performing the one or more development processes for the one or more components of the information technology asset that are mapped to the one or more identified defect-prone specifications, the one or more notifications indicating that the one or more components of the information technology asset are mapped to the one or more identified defect-prone specifications for the information technology asset.

15. A computer program product comprising a non-transitory processor-readable storage medium having stored therein program code of one or more software programs, wherein the program code when executed by at least one processing device causes the at least one processing device:
to determine one or more specifications for an information technology asset to be developed;
to identify, utilizing at least one machine learning model, whether at least one of the one or more specifications for the information technology asset is defect-prone, wherein a given one of the one or more specifications is identified as defect-prone responsive to at least one output of the at least one machine learning model indicating that the given specification has at least a threshold likelihood of resulting in one or more defects during development of the information technology asset;
to establish a mapping between the one or more identified defect-prone specifications for the information technology asset and one or more components of the information technology asset; and
to modify one or more development processes for the one or more components of the information technology asset that are mapped to the one or more identified defect-prone specifications;
wherein modifying the one or more development processes for the one or more components of the information technology asset comprises:
determining defect categories for the one or more identified defect-prone specifications for the information technology asset;
selecting, from a test script repository, one or more test scripts associated with one or more test cases utilized for the determined defect categories for one or more historical development processes to be utilized for testing the one or more components of the information technology asset mapped to the one or more identified defect-prone specifications;
applying the selected one or more test scripts as part of one or more testing processes during the one or more development processes for the information technology asset to identify one or more defects in the one or more components of the information technology asset that are mapped to the one or more identified defect-prone specifications; and
applying one or more fixes to correct the identified one or more defects in the one or more components of the information technology asset that are mapped to the one or more identified defect-prone specifications.

16. The computer program product of claim 15 wherein the at least one machine learning model comprises at least one classification model, trained on (i) descriptions for historical information technology asset specifications in a historical information technology asset specification dataset and (ii) descriptions for historical defects in a historical defect dataset, configured to determine one or more categories for an input information technology asset specification based at least in part on keywords in a description of the input information technology asset specification.

17. The computer program product of claim 16 wherein the historical information technology asset specification dataset and the historical defect dataset are merged to create a merged dataset, the merged dataset comprising, for each of the historical information technology asset specifications, a prone to defect value indicating whether that historical information technology asset specification is associated with one or more of the historical defects, and wherein the at least one machine learning model further comprises at least one prediction model, trained utilizing the merged dataset, configured to identify whether the at least one of the one or more specifications for the information technology asset is defect-prone.

18. A method comprising:
determining one or more specifications for an information technology asset to be developed;
identifying, utilizing at least one machine learning model, whether at least one of the one or more specifications for the information technology asset is defect-prone, wherein a given one of the one or more specifications is identified as defect-prone responsive to at least one output of the at least one machine learning model indicating that the given specification has at least a threshold likelihood of resulting in one or more defects during development of the information technology asset;
establishing a mapping between the one or more identified defect-prone specifications for the information technology asset and one or more components of the information technology asset; and
modifying one or more development processes for the one or more components of the information technology asset that are mapped to the one or more identified defect-prone specifications;
wherein modifying the one or more development processes for the one or more components of the information technology asset comprises:
determining defect categories for the one or more identified defect-prone specifications for the information technology asset;
selecting, from a test script repository, one or more test scripts associated with one or more test cases utilized for the determined defect categories for one or more historical development processes to be utilized for testing the one or more components of the information technology asset mapped to the one or more identified defect-prone specifications;
applying the selected one or more test scripts as part of one or more testing processes during the one or more development processes for the information technology asset to identify one or more defects in the one or more components of the information technology asset that are mapped to the one or more identified defect-prone specifications; and
applying one or more fixes to correct the identified one or more defects in the one or more components of the information technology asset that are mapped to the one or more identified defect-prone specifications; and wherein the method is performed by at least one processing device comprising a processor coupled to a memory.

19. The method of claim 18 wherein the at least one machine learning model comprises at least one classification model, trained on (i) descriptions for historical information technology asset specifications in a historical information technology asset specification dataset and (ii) descriptions for historical defects in a historical defect dataset, configured to determine one or more categories for an input information technology asset specification based at least in part on keywords in a description of the input information technology asset specification.

20. The method of claim 19 wherein the historical information technology asset specification dataset and the historical defect dataset are merged to create a merged dataset, the merged dataset comprising, for each of the historical information technology asset specifications, a prone to defect value indicating whether that historical information technology asset specification is associated with one or more of the historical defects, and wherein the at least one machine learning model further comprises at least one prediction model, trained utilizing the merged dataset, configured to identify whether the at least one of the one or more specifications for the information technology asset is defect-prone.

* * * * *